US006063750A

United States Patent [19]

Löffler et al.

[11] Patent Number: 6,063,750

[45] Date of Patent: May 16, 2000

[54] BLEACH ACTIVATOR GRANULES

[75] Inventors: Matthias Löffler, Niedernhausen; Gerd Reinhardt, Kelkheim, both of Germany

[73] Assignee: Clariant GmbH, Frankfurt, Germany

[21] Appl. No.: 09/152,841

[22] Filed: Sep. 15, 1998

[30] Foreign Application Priority Data

Sep. 16, 1997 [DE] Germany ........................... 197 40 671

[51] Int. Cl.[7] ............................. C11D 17/06; C11D 3/02; A01N 3/00; A62D 3/00

[52] U.S. Cl. ............... 510/444; 252/186.25; 252/186.38; 510/507

[58] Field of Search ......................... 252/186.25, 186.38; 510/444, 507

[56] References Cited

U.S. PATENT DOCUMENTS

| | | |
|---|---|---|
| 3,789,002 | 1/1974 | Weber et al. . |
| 4,207,199 | 6/1980 | Perner et al. . |
| 4,372,868 | 2/1983 | Saran et al. . |
| 4,457,858 | 7/1984 | Saran et al. . |
| 4,695,397 | 9/1987 | Sommer et al. . |
| 4,751,015 | 6/1988 | Humphreys et al. . |
| 4,883,917 | 11/1989 | Smith et al. . |
| 5,716,569 | 2/1998 | Berenbold et al. . |

FOREIGN PATENT DOCUMENTS

| | | |
|---|---|---|
| 0037026 | 10/1981 | European Pat. Off. . |
| 0070474 | 1/1983 | European Pat. Off. . |
| 0075818 | 4/1983 | European Pat. Off. . |
| 0240057 | 10/1987 | European Pat. Off. . |
| 0284292 | 9/1988 | European Pat. Off. . |
| 0303520 | 2/1989 | European Pat. Off. . |
| 0331229 | 9/1989 | European Pat. Off. . |
| 0458396 | 11/1991 | European Pat. Off. . |
| 0464880 | 1/1992 | European Pat. Off. . |
| 2048331 | 4/1972 | Germany . |
| 2733849 | 2/1979 | Germany . |
| 4439039 | 5/1996 | Germany . |
| 19605526 | 8/1997 | Germany . |
| 1382594 | 2/1975 | United Kingdom . |
| 1507312 | 4/1978 | United Kingdom . |
| 2249104 | 4/1992 | United Kingdom . |
| 2294694 | 5/1996 | United Kingdom . |
| WO 90/01535 | 2/1990 | WIPO . |
| WO 92/13798 | 8/1992 | WIPO . |
| WO 94/03305 | 2/1994 | WIPO . |

OTHER PUBLICATIONS

PCT Search Report.

*Primary Examiner*—Yogendra Gupta
*Assistant Examiner*—John M Petruncio
*Attorney, Agent, or Firm*—Miles B. Dearth

[57] ABSTRACT

The invention relates to bleach activator granules of ammonium nitrile and phyllosilicate, obtained by mixing the two components, compressing them and comminuting the resulting agglomerates to the desired particle size.

7 Claims, No Drawings

BLEACH ACTIVATOR GRANULES

BACKGROUND OF THE INVENTION

Bleach activators are important constituents in detergents, stain removal salts and dishwashing detergents. They permit a bleaching action even at temperatures below 60° C. by reacting with a source of hydrogen peroxide—in most cases perborates or percarbonates—to release an organic peroxy acid.

Suitable bleach activators are many reactive organic compounds having an O-acyl or N-acyl group. Representative examples such as N,N,N',N'-tetraacetylethylenediamine (TAED), glucose pentaacetate (GPA), xylose tetraacetate (TAX), sodium-4-benzoyloxybenzenesulfonate (SBOBS), sodium trimethylhexanoyloxybenzenesulfonate (STHOBS), tetraacetylglucoluril (TAGU), tetraacetylcyanic acid (TACA), di-N-acetyldimethylglyoxine (ADMG) and 1-phenyl-3-acetylhydantoin (PAH) are described in Patents GB-A-836 988, GB-A-907 356, EP-A-0 098 129 and EP-A-0 120 591.

In the meantime, cationic bleach activators which contain a quaternary ammonium group have gained in importance since they are highly effective bleach activators. Such cationic bleach activators are described, for example, in GB-A-1 382 594, U.S. Pat. No. 4 751 015, EP-A-0 284 292 and EP-A-0 331 229.

Ammonium nitrites of the formula $$R^1, R^{2\oplus}, R^3NCH_2CN\ X^\ominus$$

in which $R^1$, $R^2$ and $R^3$ are alkyl, alkenyl or aryl groups, are a particular class of cationic bleach activators. Compounds of this type and their use as bleach activators in bleaches are described in EP-A-303 520, EP-A-464 880, EP-A-458 396 and U.S. Pat. No. 4,883,917. In all of the compounds described therein, the nitrogen atom of the ammonium group is substituted by alkyl, alkenyl or aryl groups. Another class of ammonium nitrites is described in German Patent Application 19 605 526.

Normally, bleach activators are used in granulated form in detergents in order to ensure an adequate storage stability and in order to release the bleaching effect only in the wash.

For granulating bleach activators, numerous auxiliaries and processes have been described in the past. EP-A-0 037 026 describes a process for preparing readily soluble activator granules comprising between 90 and 98% by weight of activator. For this purpose, the pulverulent bleach activator is homogeneously mixed with likewise pulverulent cellulose ethers or starch ethers and then sprayed with water or an aqueous solution of the cellulose ether, simultaneously granulated and then dried.

According to EP-A-0 070 474, it is possible to prepare similar granules by spray drying aqueous suspensions comprising the activator and the cellulose ether. Granules consisting of bleach activator, cellulose ethers and additives of an organic $C_3$–$C_6$-carboxylic or hydroxycarboxylic acid are described in WO 90/01535 and WO 92/13798. While in WO 90/01535, the organic carboxylic acid is incorporated into the granule core in order to accelerate its solubility, in WO 92/13798, the carboxylic acid is deposited on the finished granule in an additional coating stage. The protective acid coating should prevent spotting of the bleach and contribute to preserving the color of the fabric. WO 94/03395 claims the use of acidic polymer compounds having a solubility in water of >5 g/l (at 20° C.) and molecular weights of from 1000 to 250,000 for the same purpose. Granules of bleach activators in which mixtures of soaps and free fatty acids are used as granulating auxiliaries are likewise known (GB-A-1 507 312).

A water-free preparation process is known from EP-A-0 075 818. Here, the bleach activator, together with an organic binder, for example a fatty alcohol ethoxylate, is compressed by compaction under pressure to give particles having diameters of from 0.5 to 3 mm.

For most of the specified granulation processes, it is a prerequisite that the bleach activator to be granulated is a solid and has a high melting point. This is necessary in order that during preparation it does not react with the binder or water present and decompose. Thus, in DE-A 2 048 331, for example, preference is given to activators which have a melting point of preferably at least 100° C., in particular at least 150° C.

The binders which have hitherto been used are predominantly organic compounds. This can, however, cause problems which limit the use of the granules.

If surface-active compounds are used, such as soaps, fatty acids, anionic surfactants or fatty alcohol ethoxylates, then the granules prepared therewith are unsuitable for use in dishwashing detergents since problems with foam arise under the washing conditions. This is even the case when normally low-foam highly ethoxylated fatty alcohols are used. For use in dishwashing detergents therefore, activator granules whose binder consists of cellulose ethers are predominantly used. The biodegradability of this group of products is, however, moderate.

A further problem relates to suitable granules for use in stain removal salts. Modern formulations consist of mixtures of percarbonate and bleach activator granules. In order to prevent exothermic decomposition of these mixtures during preparation and storage, inert materials, such as sodium carbonate, sodium hydrogencarbonate or sodium sulfate, are frequently added. For this field of application, inert binders or coating agents would be of great interest.

Inorganic materials as carriers for bleach activators are known per se. For example, DE-A 2 733 849 proposes the adsorption of liquid activators, such as diacetylmethylamine, diacetylbutylamine or acetyl caprolactam on inorganic adsorbents, such as kieselguhr, magnesium aluminum silicates, sodium or calcium aluminum silicates, activated silica or aluminum oxide.

Furthermore, according to GB-A 2 249 104, it is possible to prepare particles in which a bleach activator solid per se is deposited in finely divided form on an inorganic carrier material. For this purpose, activator and carrier material are firstly intimately mixed, and an organic solvent (ethanol or toluene) is added, as a result of which the activator goes into solution. By subsequently distilling off the solvent, the activator is deposited in very finely divided form on the carrier. The preferred particle size distribution of the particles according to the invention is between 60 and 250 $\mu$m.

In addition, EP-A-0 240 057 discloses bleach activator granules which are prepared by mixing an activator with inorganic or organic salts, film-forming polymers and small amounts of smectites or aluminum silicates and subsequently granulating the mixture in the presence of water. Once granulation is complete, a costly drying stage is necessary in order to obtain storage-stable granules.

Bleach activator granules which are obtained by mixing and compressing dry bleach activator and smectites (bentonite) in the absence of water are known from DE-A 44 39 039. The bleach activator used therein is essentially only TAED. The influence of TAED on the washing performance is, however, essentially independent of whether the TAED is in granulated form or in powder form.

SUMMARY OF THE INVENTION

Surprisingly, it has now been found that for bleach activators of the ammonium nitrile type, there are large differences as regards their washing performance between the powder form and the granule form.

The invention thus provides bleach activator granules consisting essentially of an ammonium nitrile and a phyllosilicate.

These granules are obtained by mixing the two components, compressing them and comminuting the resulting agglomerates to the desired particle size.

DESCRIPTION OF THE PREFERRED EMBODIMENTS

The granules used can be any ammonium nitriles which in granulated form have a melting point above 60° C. Those which are particularly suitable are the ammonium nitriles described in the abovementioned literature, in particular the compounds described in DE 19 605 526. Very particular preference is given to compounds of the formula

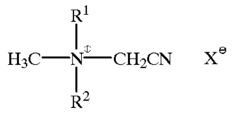

in which $R^1$ and $R^2$ are $C_1$–$C_4$ alkyl, preferably methyl, and X is an anion, for example chloride or methosulfate.

Granules may comprise one or more of these ammonium nitriles or additionally also bleach activators having another structure, for example N,N,N',N'-tetraacetylethylenediamine (TAED), glucose pentaacetate (GPA), xylose tetraacetate (TAX), sodium-4-benzoyloxybenzenesulfonate (SBOBS), sodium trimethylhexanoyloxybenzenesulfonate (STHOBS), tetraacetylglucoluril (TAGU), tetraacetylcyanic acid (TACA), di-N-acetyldimethylglyoxine (ADMG) and 1-phenyl-3-acetylhydantoin (PAH).

Binders used for forming the granules are phyllosilicates, in particular smectites, such as montmorillonites, saponites or hectorites having ion-exchange capacities of, preferably, from 50 to 100 meq/100 g, and also illites, attapulgites and kaolinites. Particular preference is given to bentonites, as are available commercially under the name ®Laundrosil DGA and Laundrosil EX 0242 from Süd-Chemie, Munich (DE). These phyllosilicates can also be used in acid-modified form, as are available in the commercial products ®Tonsil EX 519, Tonsil Optimum 210 FF, Tonsil Standard 310 FF and 314 FF, and also ®Opazil SO from Süd-Chemie, Munich (DE).

Moreover, the granules according to the invention can also comprise further auxiliaries, such as, for example, those which influence the pH during storage or use. These include organic carboxylic acids or salts thereof, such as citric acid in anhydrous or hydrated form, glycolic acid, succinic acid, maleic acid or lactic acid. In addition, additives which influence the bleaching power are also possible, such as complexing agents, polycarboxylates and iron- and manganese-containing metal complexes, as described in EP-A-0 458 397 and EP-A-0 458 398.

The weight ratio of ammonium nitrile to inorganic binder is normally from 50:50 to 98:2, preferably 70:30 to 96:4. The amount of possible additives depends in particular on their nature. For example, acidifying additives and organic catalysts for improving the performance of the per acid are added in amounts of from 0 to 20% by weight, in particular in amounts of from 1 to 10% by weight, based on the total weight, whereas metal complexes are added in concentrations in the ppm range.

The granules are prepared by firstly mixing intimately the mixture of ammonium nitrile and binder in a mixing unit (e.g. plowshare mixer). In a second step, the mixture is compressed to give relatively large particles. Devices suitable for this purpose include roller compactors. The compacts are then subjected to comminution (grinding) and comminuted to the desired particle size. Devices suitable for this purpose are toothed-disk rollers and/or sieves.

Fine fractions and coarse material are sieved off and returned to the process. While the coarse fraction is passed directly to be recomminuted, the fine fraction is fed to the compacting stage. The particle size of the product is generally in the range from 100 to 2000 μm, preferably from 300 to 1800 μm. The bulk density of the granules according to the invention is above 500 $kg/m^3$, preferably above 600 $kg/m^3$.

The granules obtained in this way are suitable for direct use in detergents and cleaning compositions. In a particularly preferred use form, they can, however, be provided with a coating sheath.

To this end, the granules according to the invention are coated with a film-forming substance in an additional step, as a result of which the product properties can be significantly influenced.

Suitable coating materials are all film-forming substances, such as waxes, silicones, fatty acids, soaps, anionic surfactants, nonionic surfactants, cationic surfactants and anionic and cationic polymers, e.g. polyacrylic acids. By using these coating materials, it is possible inter alia to delay the dissolution behavior in order to stop interactions between the bleach activator and the enzyme system at the start of the washing process.

If the intention is to use the granules according to the invention in dishwashing detergents, the most suitable coatings are waxes having melting points of from 40 to 50° C.

Acid coating materials increase the storage stability of the granules in highly alkaline formulations, which contain percarbonates, and reduce color damage by spotting. Dye additives are likewise possible.

The coating materials are normally applied by spraying the molten coating materials or coating materials dissolved in a solvent. In accordance with the invention, the coating material can be applied to the granule core according to the invention in amounts of from 0 to 20% by weight, preferably from 1 to 10% by weight, based on the total weight.

The products according to the invention are notable for good storage stability in pulverulent detergents, cleaning compositions and disinfectant formulations. They are ideal for use in standard detergents, stain removal salts, dishwashing detergents, all-purpose cleaning powders and denture cleaners.

In these formulations, the granules according to the invention are used in combination with a hydrogen peroxide source. Examples thereof are perborate monohydrate, perborate tetrahydrate, percarbonates and also adducts of hydrogen peroxide with urea or amine oxides. In addition, the formulation, in accordance with the prior art, can have further constituents, such as organic and inorganic builders and cobuilders, surfactants, enzymes, optical brighteners and perfume.

PREPARATION AND APPLICATION EXAMPLES

EXAMPLE 1

(Preparation)

In each case, 10 kg of a mixture of 92% by weight ammonium nitrile (trimethylammoniumacetonitrile toluenesulfonate=granules 1 or N-cyanomethyl-N-methylpiperazinium toluenesulfonate=granules 2) and 8% by weight bentonite (®Laundrosil DGA) are intensively mixed at a speed of 70 rpm in a 50 1 Lödige mixer over a period of 10 min.

This homogeneous mixture is then compressed to flakes on a Pharmapaktor roller compactor (Bepex (DE)) at a pressing force of from 50 to 60 kN; the flakes are then comminuted in a two-stage grinding, pregrinding using toothed-disk rollers (Alexanderwerk (DE)) and comminution in a sieve (Frewitt (DE)) at a mesh size of 2000 μm.

This gives 5.3 kg of granules having a particle size distribution of from 200 to 1600 μm (yield: 53%), and also 2.8 kg of fine material<200 μm (28%), which can be recycled by recompacting, and 1.9 kg of coarse material>1600 μm (19%), which can be processed by regrinding.

EXAMPLE 2

(Storage Stability)

To determine the storage stability, 10 g of standard detergent WMP without bleaching system (Krefeld Laundry Research (DE)) were homogeneously mixed with 1.5 g of sodium perborate monohydrate and 0.5 g of activator or 0.5 g of activator containing activator granules, and the mixture is then stored in folding boxes at 38° C. and 80% relative atmospheric humidity in a climatically controlled cabinet (quick test). At certain intervals, the remaining activator content was determined by iodometric titration.

The activators used were trimethylammoniumacetonitrile toluenesulfonate (1) and N-cyanomethyl-N-methylpiperazinium toluenesulfonate (2), in each case as powders, and the activator granules used were granules 1 and granules 2 as in Example 1.

TABLE 1

| | Residual content of activator (%) | | | |
|---|---|---|---|---|
| Days | Ammonium nitrile 1 | Ammonium nitrile 2 | Granules 1 | Granules 2 |
| 2 | 98 | 92 | 98 | 98 |
| 7 | 72 | 69 | 92 | 93 |
| 10 | 41 | 37 | 87 | 85 |
| 14 | 20 | 14 | 82 | 80 |

This example shows that the ammonium nitrites in pulverized form rapidly lose their content of active substance. On the other hand, in granulated form the activators are storage-stable.

EXAMPLE 3

(Bleaching Activity)

The bleaching activity of the granules according to the invention was tested on bleaching test fabrics in the presence of pure test laundry in an Öko-Lavamat 6753 multicomponent washing machine (AEG, Nuremberg) under conditions simulating those met in practice. According to the dosing instructions for water hardness region 3, 70 g of reference detergent (WMP) were introduced into the detergent compartments of the washing machine. The bleaching components added to the detergent compartment were 8.0 g of percarbonate and 2.93 g of bleach activator granules 1 (92% strength) as in Example 1, 3.37 g of bleach activator granules 2 (92% strength) as in Example 1, 2.52 g of bleach activator granules 3 (92% strength) based on TAED as in Example 1 from DE-A 44 39 039.

For comparison, the ammonium nitrites trimethylammoniumacetonitrile toluenesulfonate (1) and N-cyanomethyl-N-methylpiperazinium toluenesulfonate (2) and also TAED (3) in nongranulated form were tested:

2.7 g of bleach activator powder 1

3.1 g of bleach activator powder 2

2.3 g of bleach activator TAED powder

The ballast substance used was 2 kg of terry fabric, and the test soilings were 10 bleachable soilings (tea, red wine, curry, grass from Krefeld Laundry Research). The laundry was washed in the main wash at 40° C. Evaluation takes place by determining the degree of whiteness after washing by addition of the reflectance differences, measured using an ELREPHO 2000 (Datacolor).

TABLE 2

| Reflectance differences | | | | | |
|---|---|---|---|---|---|
| Granules 1 | Granules 2 | Granules 3 | Powder 1 | Powder 2 | Powder 3 |
| 310 | 285 | 194 | 55 | 63 | 200 |

T=40° C.; tea, red wine, curry, grass

This example shows that in the case of the ammonium nitrites, granulation can achieve a very significant increase in the bleaching performance. This is surprising because granulation of the activator TAED, which is widely used in practice, has no significant effect on the bleaching performance.

We claim:

1. Bleach activator comprising granules of a compressed comminuted admixture of a bleach activator consisting of one or more ammonium nitrites and a phylosilicate, said one of said ammonium nitrites has the structure

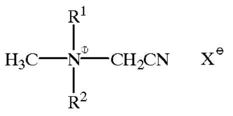

in which $R^1$ and $R^2$ are $C_1$–$C_4$-alkyl and X is an anion.

2. The bleach activator granules as claimed in claim 1, which, in addition to the ammonium nitriles, comprise bleach activators having another structure.

3. The bleach activator granules as claimed in claim 1, wherein the phyllosilicate present comprises natural or acid-modified bentonites.

4. The bleach activator granules as claimed in claim 1, which essentially consist of ammonium nitrile and phyllosilicate in the weight ratio from 50:50 to 98:2.

5. The bleach activator granules as claimed in claim 1, which have a particle size of from 100 to 2000 μm.

6. The bleach activator granules as claimed in claim 1, which comprise up to 20% by weight, based on the weight of the granules, of one or more additives in the form of inorganic acids, organic acids, complexing agents, ketones and metal complexes.

7. A detergent, cleaning composition, bleach or disinfectant comprising bleach activator granules as claimed in claim 1.

* * * * *